US010198704B2

(12) United States Patent
Myers

(10) Patent No.: US 10,198,704 B2
(45) Date of Patent: Feb. 5, 2019

(54) METHODS FOR DYNAMICALLY IDENTIFYING LOADS FOR A TRUCKER

(71) Applicant: Charles F Myers, Midlothian, VA (US)

(72) Inventor: Charles F Myers, Midlothian, VA (US)

( * ) Notice: Subject to any disclaimer, the term of this patent is extended or adjusted under 35 U.S.C. 154(b) by 483 days.

(21) Appl. No.: 14/933,779

(22) Filed: Nov. 5, 2015

(65) Prior Publication Data

US 2017/0132547 A1 May 11, 2017

(51) Int. Cl.
| | | |
|---|---|---|
| G06Q 10/00 | (2012.01) | |
| G06Q 10/06 | (2012.01) | |
| H04W 4/021 | (2018.01) | |
| G06F 17/30 | (2006.01) | |

(52) U.S. Cl.
CPC . *G06Q 10/06315* (2013.01); *G06F 17/30864* (2013.01); *H04W 4/021* (2013.01)

(58) Field of Classification Search
None
See application file for complete search history.

(56) References Cited

U.S. PATENT DOCUMENTS

| | | | | | |
|---|---|---|---|---|---|
| 4,974,215 | A * | 11/1990 | Bolz | ............... | B60Q 1/48 367/108 |
| 6,124,810 | A * | 9/2000 | Segal | ............... | G08G 1/20 340/441 |
| 6,282,489 | B1 * | 8/2001 | Bellesfield | ......... | G01C 21/3676 701/426 |
| 6,801,901 | B1 * | 10/2004 | Ng | ............... | G06Q 10/087 701/400 |
| RE43,178 | E * | 2/2012 | Ghazarian | ............... | G06Q 10/08 340/5.92 |
| 8,645,014 | B1 * | 2/2014 | Kozlowski | ............... | H04W 4/70 701/24 |
| 9,280,559 | B1 * | 3/2016 | Jones | ............... | H04L 61/1582 |
| 9,396,449 | B2 * | 7/2016 | Wada | ............... | G06Q 10/06 |
| 9,460,410 | B2 * | 10/2016 | Hill | ............... | G06Q 10/0631 |
| 9,743,239 | B1 * | 8/2017 | Mishra | ............... | H04W 4/023 |
| 2002/0130065 | A1 * | 9/2002 | Bloom | ............... | B07C 3/00 209/630 |
| 2003/0233190 | A1 * | 12/2003 | Jones | ............... | G06Q 10/08 701/465 |
| 2005/0062590 | A1 * | 3/2005 | Lang | ............... | B60D 1/62 340/431 |

(Continued)

OTHER PUBLICATIONS

Myrna Palmgren (Optimal Truck Scheduling—Mathematical Modeling and Solution by the Column Generation Principle, Linköping Studies in Science and Technology Dissertations No. 967, 2005). (Year: 2005).*

(Continued)

*Primary Examiner* — Hafiz A Kassim
(74) *Attorney, Agent, or Firm* — Tran & Associates

(57) ABSTRACT

Systems and methods are disclosed for truck load fulfillment by tracking geographical location of a device of a truck driver relative to a point of interest for each truck load; matching the geographical location of the device to a category of interest associated with the truck driver; sending a notification to the device of a nearby position of the load, the nearby position of the load related to the category of interest, the notification sent in response to proximity of the geographical location of the device relative to the position of the load.

18 Claims, 14 Drawing Sheets

(56) References Cited

U.S. PATENT DOCUMENTS

| | | | | |
|---|---|---|---|---|
| 2005/0278063 | A1* | 12/2005 | Hersh | G06Q 10/06311 700/216 |
| 2006/0242154 | A1* | 10/2006 | Rawat | G06F 17/30126 |
| 2006/0282284 | A1* | 12/2006 | Daniel | G06Q 10/08 705/80 |
| 2008/0084333 | A1* | 4/2008 | Forrest | G06Q 10/06 340/989 |
| 2008/0097698 | A1* | 4/2008 | Arnold-Huyser | G01C 21/3682 701/300 |
| 2008/0097812 | A1* | 4/2008 | Davis | G06Q 10/047 705/7.12 |
| 2008/0125965 | A1* | 5/2008 | Carani | G07C 5/008 701/408 |
| 2008/0188217 | A1* | 8/2008 | Harter | G06Q 10/08 455/426.1 |
| 2008/0288338 | A1* | 11/2008 | Wiseman | G06Q 30/02 705/14.69 |
| 2009/0055091 | A1* | 2/2009 | Hines | G01C 21/30 701/408 |
| 2009/0299792 | A1* | 12/2009 | Baur | G06Q 10/08 705/28 |
| 2010/0325014 | A1 | 12/2010 | Widjojo | |
| 2011/0151898 | A1* | 6/2011 | Chandra | H04W 4/02 455/466 |
| 2011/0313811 | A1* | 12/2011 | Urban | B60P 3/0257 705/7.25 |
| 2012/0000212 | A1* | 1/2012 | Sanders | F25D 29/003 62/62 |
| 2012/0188061 | A1* | 7/2012 | Roberts, Sr. | G08G 1/20 340/10.41 |
| 2012/0197484 | A1* | 8/2012 | Nath | G01S 5/0072 701/32.4 |
| 2012/0209787 | A1* | 8/2012 | Foulds | G06Q 10/083 705/333 |
| 2012/0295639 | A1* | 11/2012 | Fitoussi | H04W 4/021 455/456.3 |
| 2012/0303458 | A1* | 11/2012 | Schuler, Jr. | G09F 27/005 705/14.63 |
| 2012/0316963 | A1* | 12/2012 | Moshfeghi | G06Q 20/20 705/14.58 |
| 2013/0018705 | A1* | 1/2013 | Heath | G08G 1/017 705/13 |
| 2013/0057686 | A1* | 3/2013 | Genc | B60R 1/00 348/148 |
| 2013/0103750 | A1* | 4/2013 | Awad | G06Q 30/02 709/203 |
| 2013/0179362 | A1* | 7/2013 | Rhyan | G06Q 10/08345 705/335 |
| 2015/0006428 | A1* | 1/2015 | Miller | G06Q 10/0835 705/336 |
| 2015/0038107 | A1* | 2/2015 | Messerly | H04W 4/90 455/404.2 |
| 2015/0080031 | A1* | 3/2015 | Moldavsky | H04W 4/02 455/456.3 |
| 2016/0358477 | A1* | 12/2016 | Ansari | G08G 1/167 |
| 2017/0078840 | A1* | 3/2017 | Saurav | H04W 4/021 |
| 2018/0096287 | A1* | 4/2018 | Senger | G06Q 10/08355 |

OTHER PUBLICATIONS

Kenneth J. Dueker and J. Allison Butler et al. (A geographic information system framework for transportation data sharing, Elsevier Science, Transportation Research Part C 8 (2000) 13-36). (Year: 2000).*

Trucker Path web site product description, Nov. 5, 2015.

* cited by examiner

Smartphone Location Discovery Technology

System Executes Automatic Location Discovery

METHODS FOR DYNAMICALLY IDENTIFYING LOADS FOR A TRUCKER

BACKGROUND

The present application relates to truck load management.

Truck driving is a demanding job. The schedule of a typical trucker is going out on the road for several weeks at time, and then having a few days home, which is called Hometime. Learning to control the truck and trailer that he or she will be operating may be one of the biggest physical challenges of the job. Truckers may be expected to work up to 70 hours over an eight-day period and then cannot drive again until the driver take a full 34 hours off duty. Some drivers are paid hourly, but in most cases compensation is calculated by mile. A delivery driver does not get paid when he or she is not delivering. Thus, truck drivers are always looking for loads.

SUMMARY

In one aspect, systems and methods are disclosed for dynamically discovering matching loads for truckers on-the-road.

In another aspect, systems and methods are disclosed for truck load fulfillment by tracking geographical location of a device of a truck driver relative to a point of interest for each truck load; matching the geographical location of the device to a category of interest associated with the truck driver; sending a notification to the device of a nearby position of the load, the nearby position of the load related to the category of interest, the notification sent in response to proximity of the geographical location of the device relative to the position of the load.

Advantages of the system may include one or more of the following. The system enables a dynamic discovery of a trucker's interest in particular customers with predetermined loads while in motion, and automatically notifies the truck driver of nearby loads that need to be picked up. A geolocation module is installed on a truck driver device (e.g., a mobile phone) and computes the proximity of the truck driver device to the position of the load. When certain criteria are met (e.g., proximity to the position of the load, anticipated time of arrival at the position of the load, etc.), the truck driver can be automatically notified of the nearby position of the load. For example, if the truck driver (and truck driver device) is at a 1-mile distance for the position of the load, a notification can be triggered to the truck driver (the truck driver device), which indicates additional information about the position of the load, for example. In another example, by processing the geolocation information it is computed that the truck driver is approaching the position of the load at a certain velocity, the time of arrival at the position of the load and/or a virtual notification perimeter (e.g., geo-fence) can trigger the notification to the truck driver (device). The truck driver can define categories of the load, such as those needing refrigeration or flat-bed capacity, for example. Accordingly, when the truck driver's device is within a predefined proximity of customer requiring a flat bed truck, these customer locations are highlighted for the driver. When utilizing proximity as the criteria, the proximity relative to a position of the load can be determined according to geo-fencing. A geo-fence is a predefined virtual perimeter (e.g., within a two mile radius of a position of the load) of a physical geographic area.

With respect to a notification phase, while the truck driver is moving, the truck driver device continuously monitors the truck driver geographical location and alerts the truck driver of points of interest that match categories of interest in the vicinity of the truck driver.

The truck location (truck driver device) can be determined and obtained using geo-location technologies such as global positioning system (GPS), cell tower systems (triangulation), Wi-Fi™ (used to certify the interoperability of wireless computer networking devices) access points, the mobile operator, and so on.

The geo-location information for points of interest can be stored in a storage component such as a repository. The points of interest and associated geo-location information can be obtained from various sources such as web searches, and read from databases, for example.

DESCRIPTION

Figure 1:
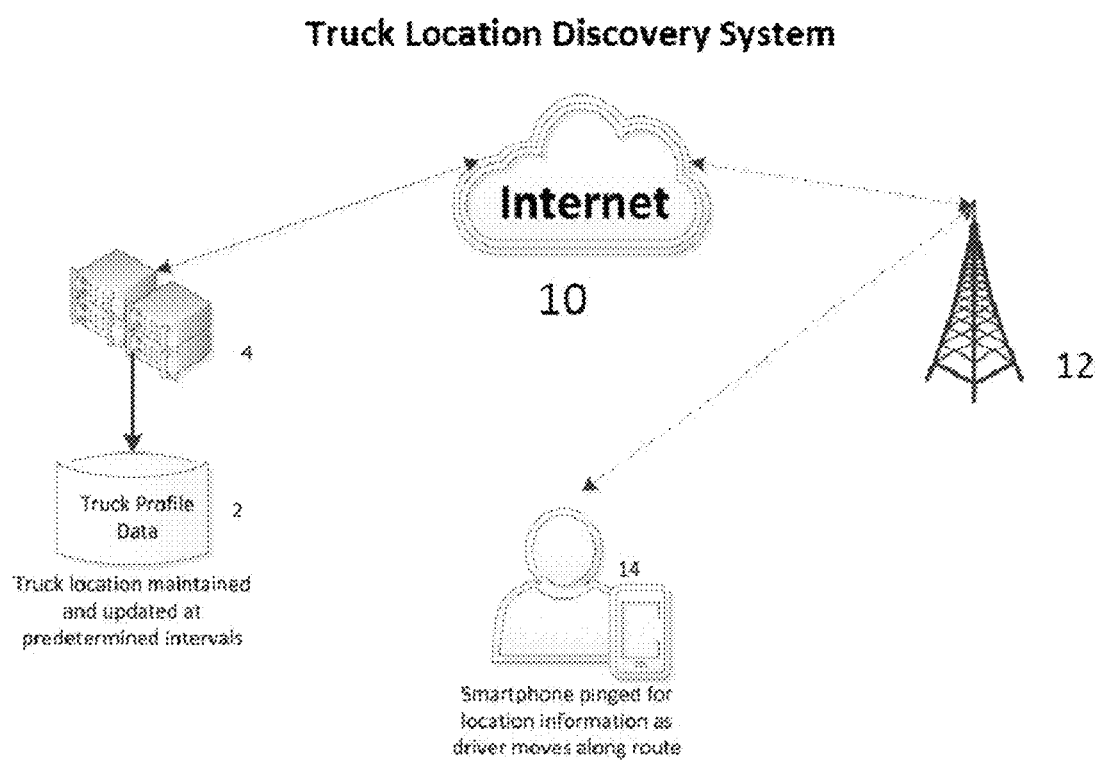
FIG. 1 shows an exemplary truck location discovery system over the internet.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 1 shows an exemplary truck location discovery system over the internet 10. The system stores truck location in a truck profile database 2 that communicates with servers 4 that in turn communicate over the Internet 10. A plurality of cell towers 12 also communicate over the Internet 10 and supports wireless communication from mobile devices 10 on a trucker to access the truck profile database 2. The database keeps truck location information and provides updates at predetermined intervals.

Figure 2:
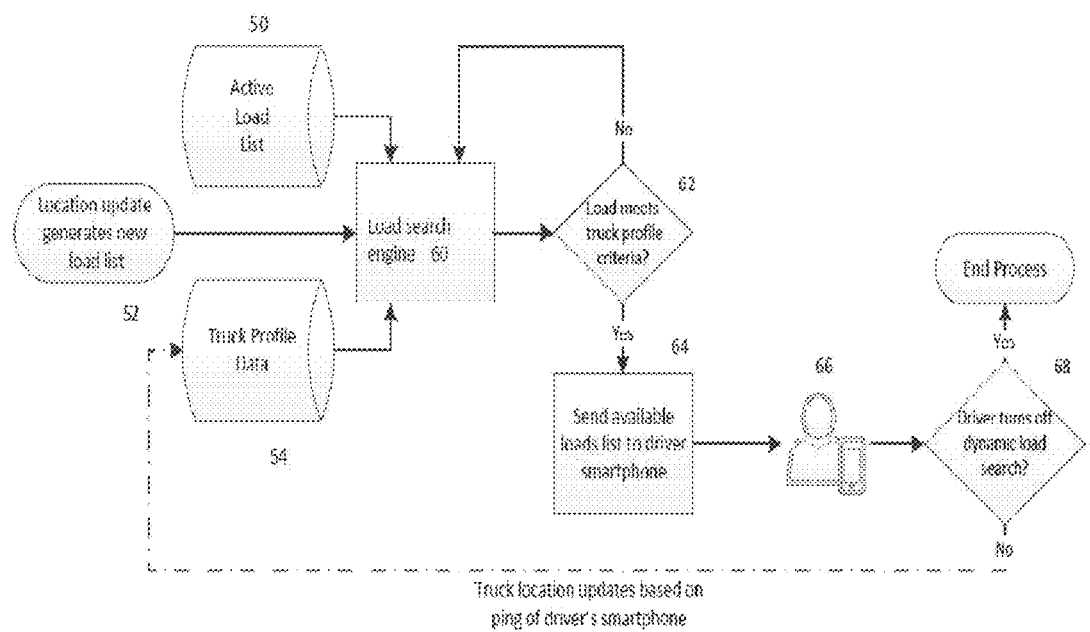
FIG. 2 shows an exemplary process for dynamic load discovery based on location.

FIG. 2 shows an exemplary process for dynamic load discovery based on location. The process provides an active load list 50 into a load search unit 60. New load lists 52 are also provided to the load search unit 60, as is truck profile data 54. The load search unit 60 checks if a particular load meets a selected truck profile criteria in 62. If not, the next truck is search by unit 60, and otherwise in 64 the process sends available load lists to a truck driver's smart phone 66. The phone checks if the driver has agreed to pick up a load and does not need additional load searches in 68. If not, the truck profile is updated to indicate that the trucker is still available, and otherwise the process exits.

Figure 3:
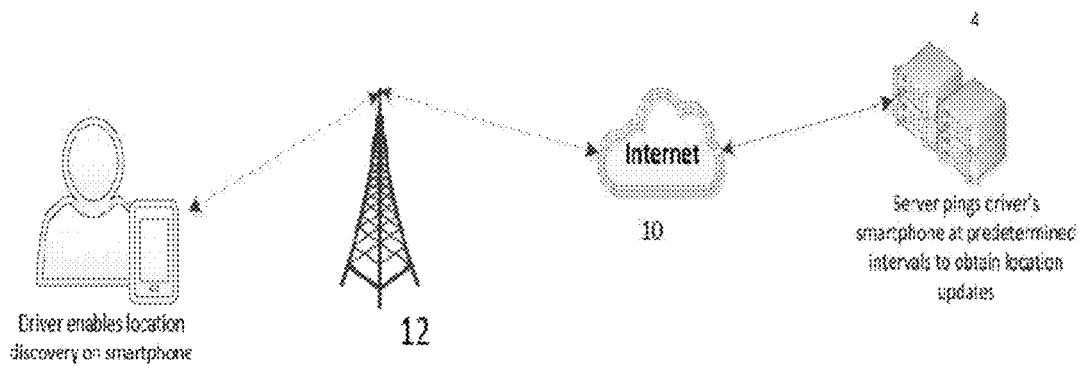
FIG. 3 shows an exemplary mobile device providing location discovery.

FIG. 3 shows an exemplary mobile device 14 providing location discovery. The device 14 has a GPS that captures the phone's current location, which is a proxy for the truck position, and transmits the position through tower 12 and the Internet 10 to a plurality of servers 4. The server 4 pings the driver's smart phone 14 periodically to ascertain current phone/truck position. This information is then updated on maps as shown in subsequent figures.

While a truck driver device has been described as a smart phone, the inventor contemplates that it can be any suitable mobile computers such as tablets, smart-watches, or geolocation tracking in the truck itself. Additionally, while cellular channels are described, other communication protocols are contemplated such as WiFi, WiMax, or non-cellular networks such as low earth orbit satellite networks.

Figure 4:
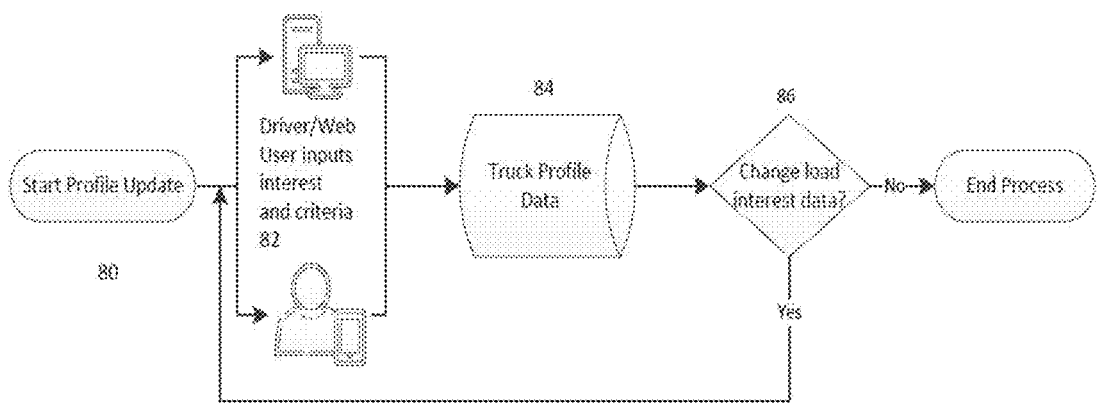
FIG. 4 shows an exemplary process for user update of load categories of interest.

FIG. 4 shows an exemplary process for user update of load categories of interest. First, the profile update is started in 80. The driver or the web user can input various categories of interest and criteria 82. The information is stored or updated in the truck profile database in 84. Next, the process determines if the user wishes to change load interest data in 86 and if so loops back to 82 and otherwise exits the process.

Figure 5:
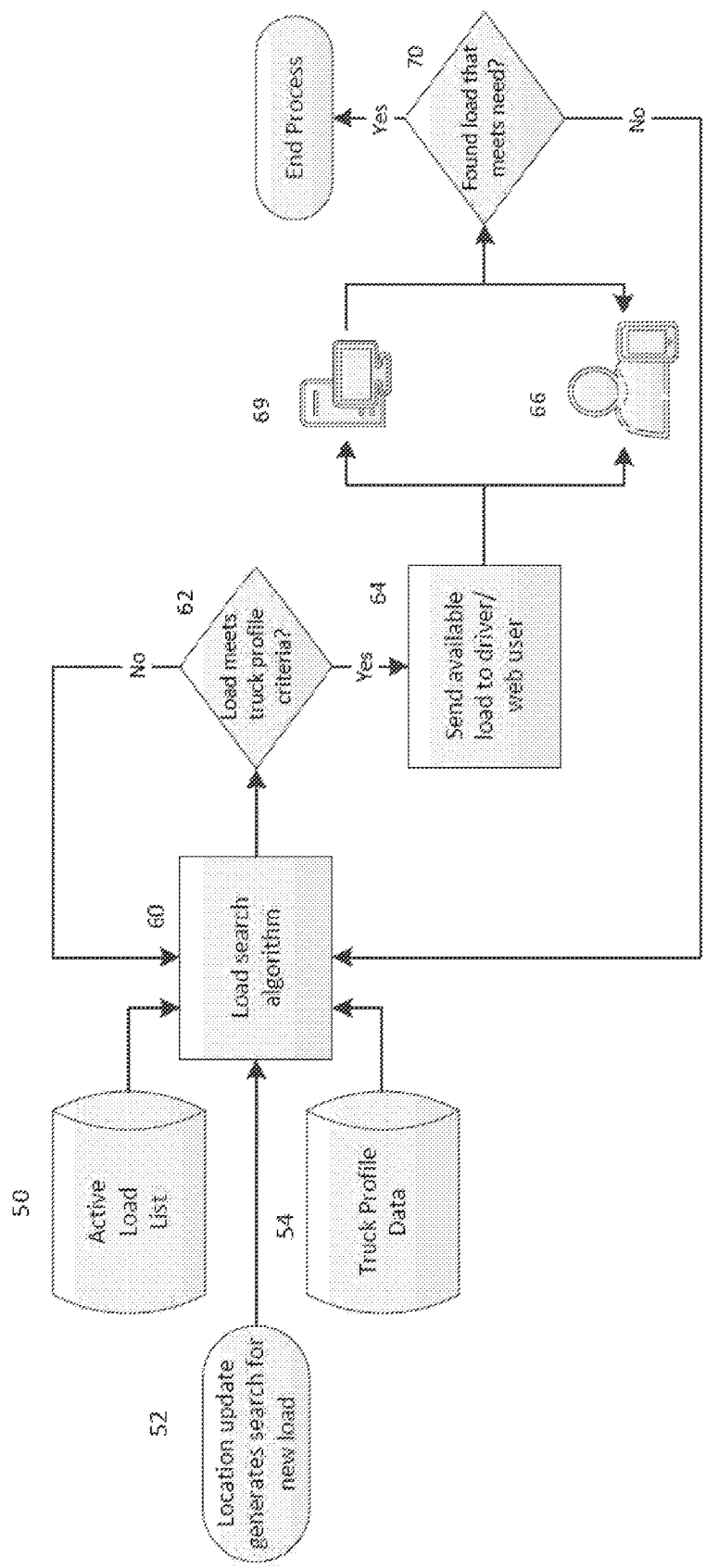
FIG. 5 shows an exemplary process for notifying a trucker/user of a nearby load of interest.

FIG. 5 shows an exemplary process for notifying a trucker/user of a nearby load of interest. The process provides an active load list 50 into a load search unit 60. New load lists 52 are also provided to the load search unit 60, as is truck profile data 54. The load search unit 60 checks if a particular load meets a selected truck profile criteria in 62. If not, the next truck is search by unit 60, and otherwise in 64 the process sends available load lists to a truck driver's smart phone 66 or a broker computer 69. The phone checks if the load meets the trucker's load characteristics or travel path in 70. If not, the process loops back to 60 to keep searching for a load of interest, and otherwise the process exits.

Figure 6:
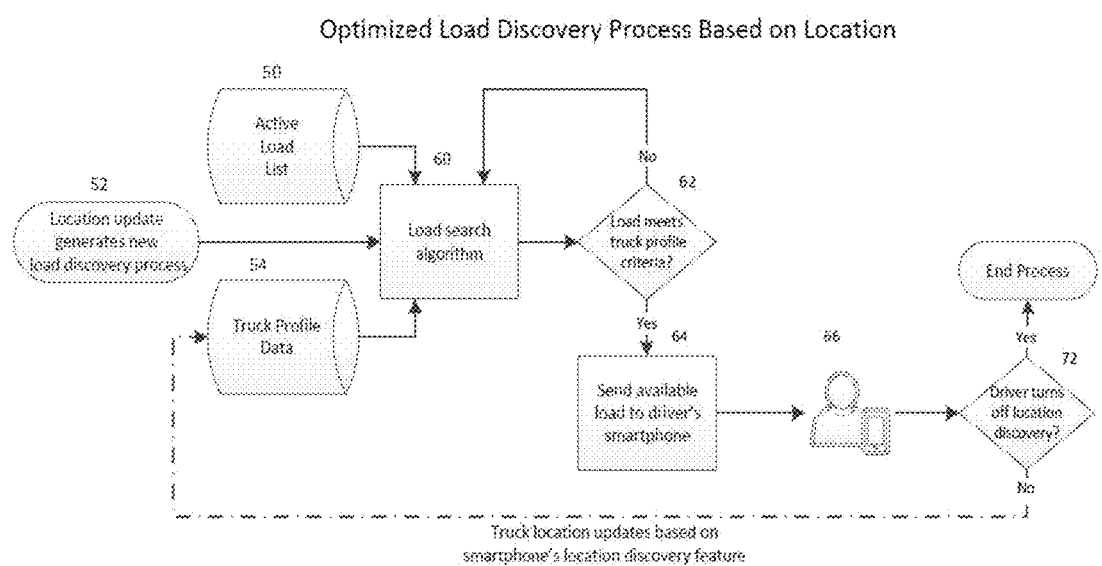
FIG. 6 shows an optimized load discovery process based on location.

FIG. 6 shows an optimized load discovery process based on location. Similar to the other operations, the driver phone 66 is used to check if the driver has turned off the location discover in 72. If not, the process updates truck location based on the trucker's phone location discovery module and then loops back to 54. Otherwise the process exits.

Figure 7:
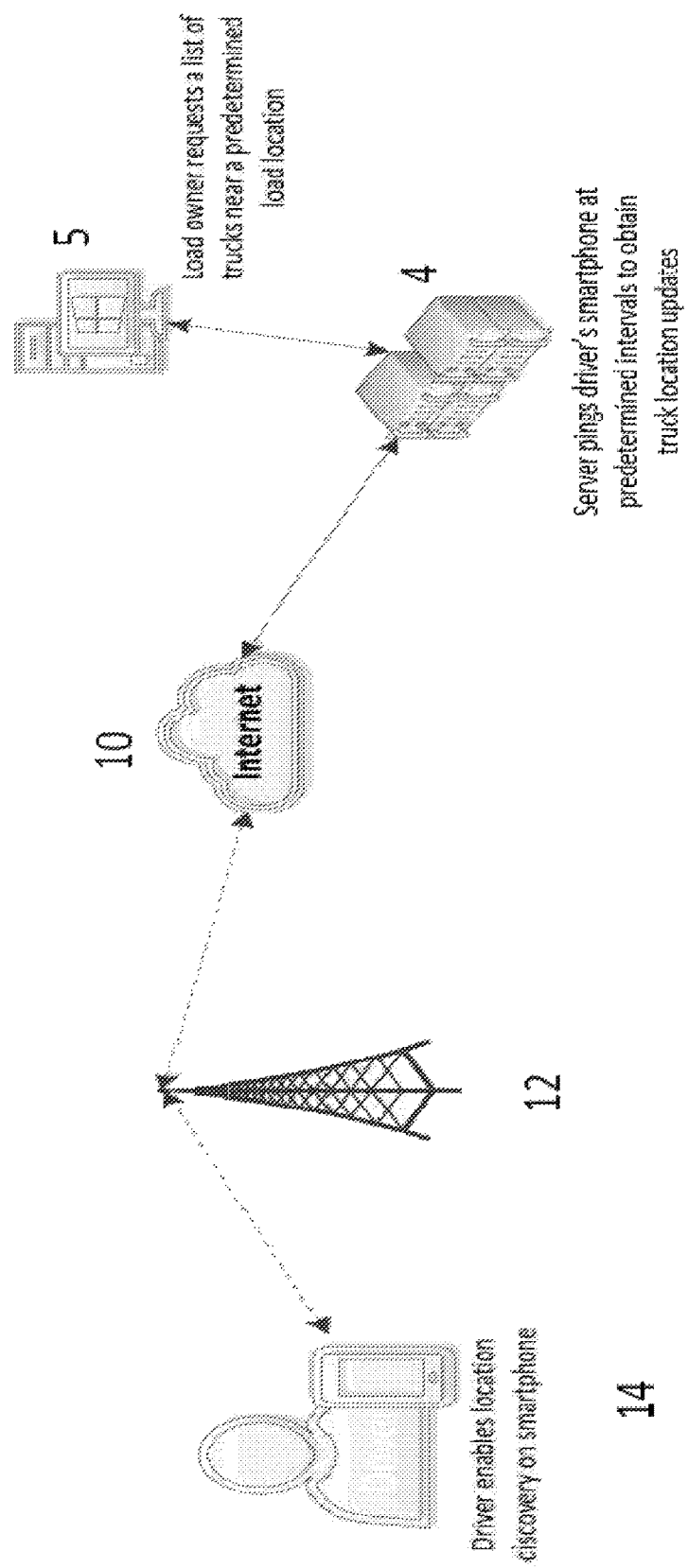
FIG. 7 illustrates an example where a server pings a phone to provide nearby truck location.

FIG. 7 illustrates an example where a server pings a phone to provide nearby truck location. In this process, the driver enables location discover on his/her smart phone 14. Data is wirelessly communicated over the Internet to server 4, which pings the driver's phone at predetermined intervals to obtain truck location updates. The information can be viewed by brokers/load owners when they request a list of trucks near a predetermined location.

Figure 8:
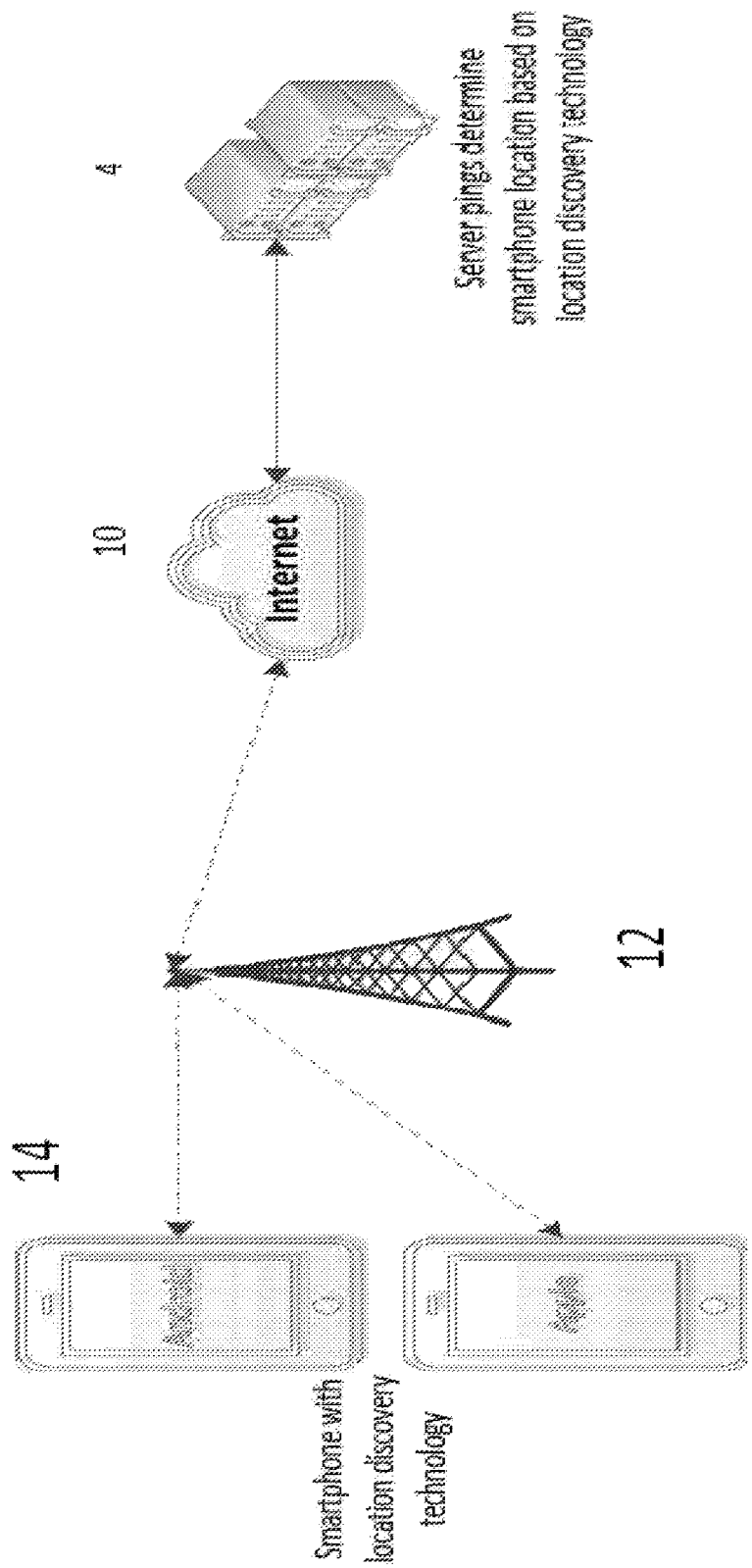
FIG. 8 shows an exemplary smart phone location discover for trucking usage.

FIG. 8 shows an exemplary smart phone location discover for trucking usage. In this process, each smart phone 14 runs an app that provides location discover responsive to pings from server 4 over the Internet to determine the location of the phone and infer the location of the truck affiliated with the phone 14.

Figure 9:
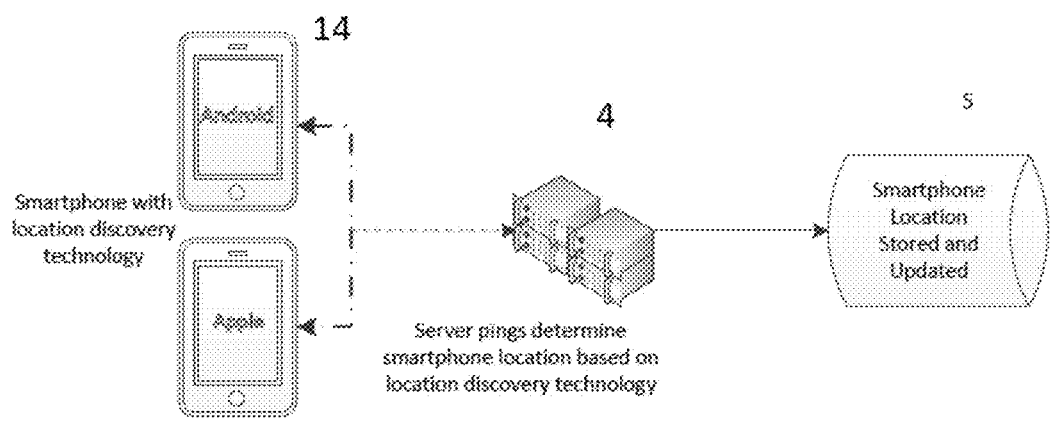
FIG. 9 shows an exemplary smart phone location discovery system.
Figure 10:
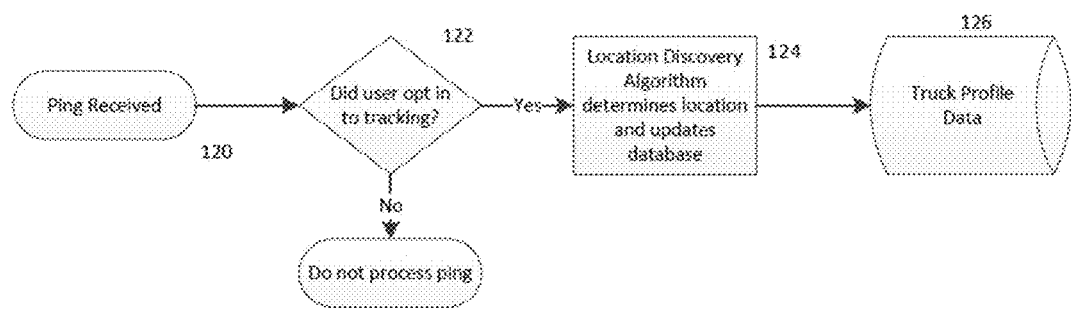
FIG. 10 shows an exemplary automatic location discovery process.

FIG. 9 shows an exemplary smart phone location discovery system. In this embodiment, Android, Windows, or iPhones 14 can respond to server pings to determined the location of the smart phone and the truck, respectively. The responsive location is stored or updated in a database 5. The automatic location discovery process is detailed in FIG. 10, where a ping is received in 120. The process checks for user tracking opt-in in 122. If not permitted the process ignores the ping and otherwise the process determines the location and updates the location database in 124. The current truck location is updated in the truck profile database 126. The current location can be rendered in a manner similar to FIG. 11B, for example.

Figure 11A:
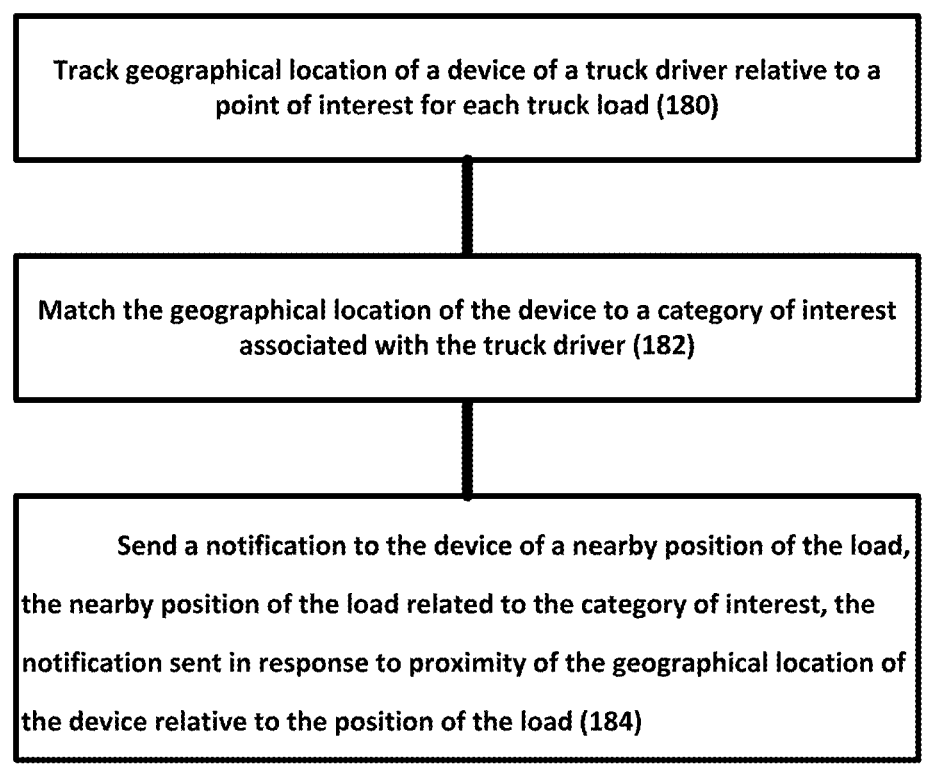
FIG. 11A illustrates a location discovery process for a trucker.

FIG. 11A shows an exemplary load matching process for truckers and shippers. First, the process tracks geographical location of a device of a truck driver relative to a point of interest for each truck load (180). The process includes matching the geographical location of the device to a category of interest associated with the truck driver (182) and sending a notification to the device of a nearby position of the load, the nearby position of the load related to the category of interest, the notification sent in response to proximity of the geographical location of the device relative to the position of the load (184).

Figure 11B:
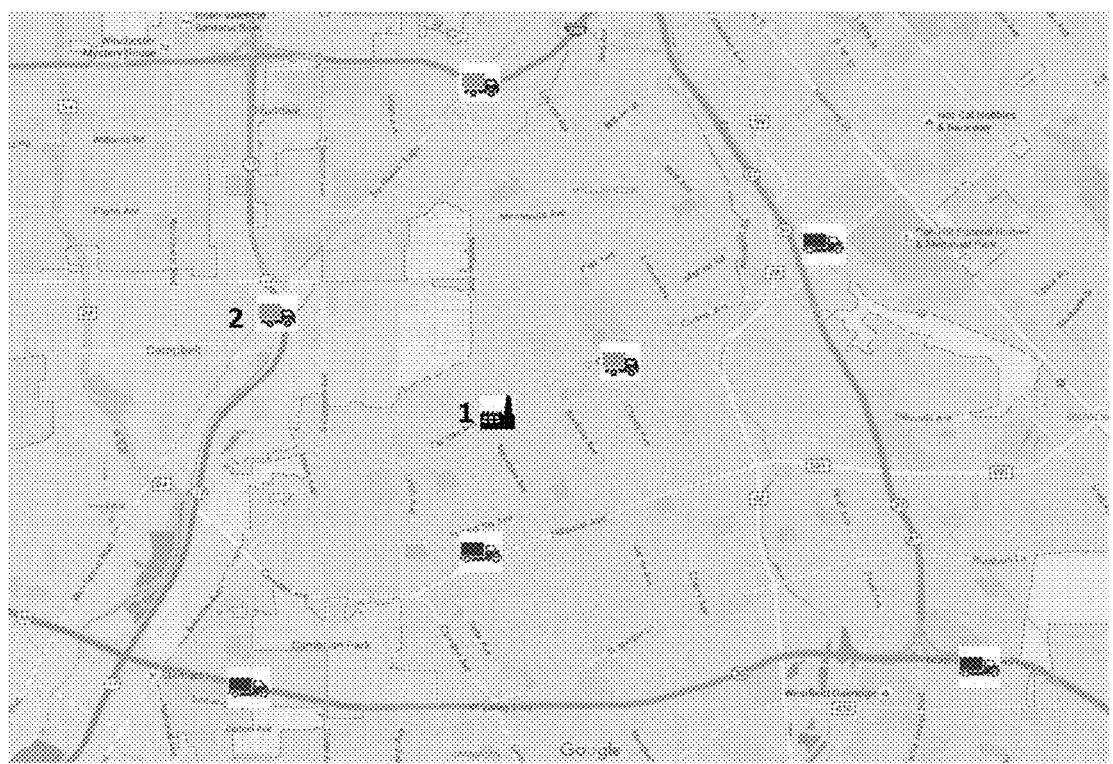
FIG. 11B shows an exemplary user interface to show matching truckers and loads.

FIG. 11B shows an exemplary user interface to match shippers to truckers where a customer 1 (freight shipper or broker) views on a screen available trucks 2. The trucker 2 has a mobile computer which can be a smart phone, for example. As the trucker drives along his or her path, the trucker encounters various potential loads that need to be processed at various points of interest (POI). Upon viewing the profile of each truck 2, the customer 1 can select one or more trucks for quotations and/or bidding. The customer would enter the load capacity desired, the type of load, the start and destination addresses, and desired delivery date. The information is then sent to the process of FIG. 1A for communication with the truckers 2. The truck driver can define categories of the load, such as those needing refrigeration or flat-bed capacity, for example. Accordingly, when the truck driver's device is within a predefined proximity of customer requiring a flat bed truck, these customer locations are highlighted for the driver. When utilizing proximity as the criteria, the proximity relative to a position of the load can be determined according to geo-fencing. A geo-fence is a predefined virtual perimeter (e.g., within a two mile radius of a position of the load) of a physical geographic area.

With respect to a notification phase, while the truck driver is moving, the truck driver device continuously monitors the truck driver geographical location and alerts the truck driver of points of interest that match categories of interest in the vicinity of the truck driver.

An exemplary notification dialog notifies the truck driver of a nearby position of the load. The dialog can be presented using any presentation program such as a browser, for example, of a mobile device (e.g., a cell phone). Here, the dialog indicates the category of interest (e.g., vegetables requiring refrigeration) and the specific position of the load (e.g., city address). The dialog provides the options to the truck driver to close the dialog and to select a details button for more detailed information about the specific Burger Restaurant. The depicted dialog is not to be construed as limiting in any way since, other options and information can be provided as desired.

Figure 11C:
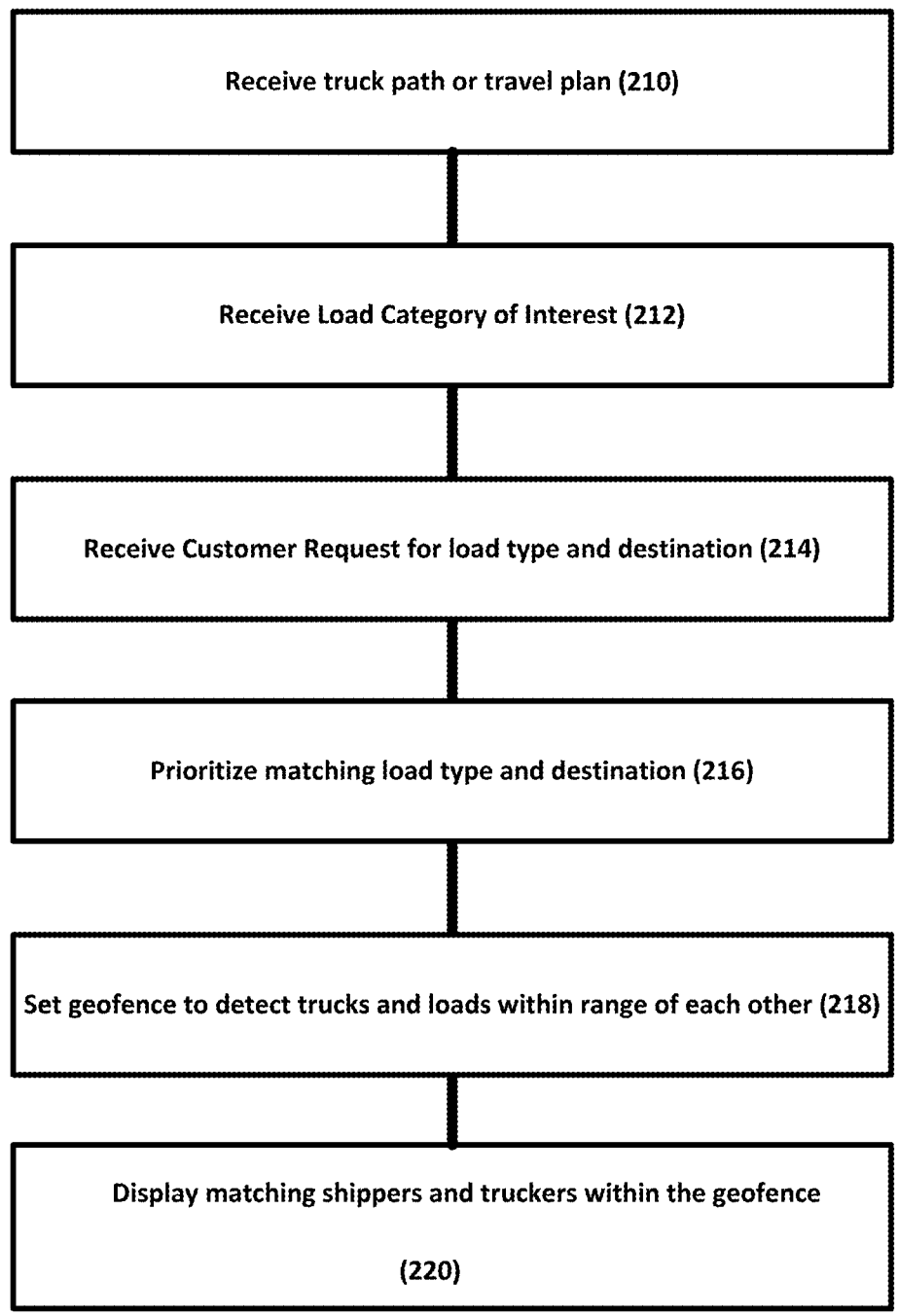
FIG. 11C shows an exemplary process to provide dynamic discovery of a trucker's interest in particular customers with predetermined loads while in motion.

FIG. 11C shows an exemplary process to dynamically discover loads for the trucker. The process of FIG. 11B detects the current truck path or travel plan (210). This can be inferred from a GPS mapping process where the driver indicates his/her destination and the mapping unit generates a route that goes through two cities A and B, for example. Once the path is determined in 210, the process captures the load types that the trucker is interested in (212). The process then searches a database for previously entered customer requests with load type and destination (214). The process then prioritizes the matching load type and the desired destination (216). As the trucker 100 travels along the travel plan, the process sets up a moving geo-fence (218). Thus, when the truck arrives at a particular geofence, only matching POIs are shown on the map. Using the process of FIG. 1B, the system provides a dynamic discovery of a trucker's interest in particular customers with predetermined loads while in motion, and automatically notifies the truck driver of nearby loads that need to be picked up. A geolocation module is installed on a truck driver device (e.g., a mobile phone) and computes the proximity of the truck driver device to the position of the load. When certain criteria are met (e.g., proximity to the position of the load, anticipated time of arrival at the position of the load, etc.), the truck driver can be automatically notified of the nearby position of the load. For example, if the truck driver (and truck driver device) is at a 1-mile distance for the position of the load, a notification can be triggered to the truck driver (the truck driver device), which indicates additional information about the position of the load, for example. In another example, by processing the geolocation information it is computed that the truck driver is approaching the position of the load at a certain velocity, the time of arrival at the position of the load and/or a virtual notification perimeter (e.g., geo-fence) can trigger the notification to the truck driver (device).

The truck location (truck driver device) can be determined and obtained using geo-location technologies such as global positioning system (GPS), cell tower systems (triangulation), Wi-Fi™ (used to certify the interoperability of wireless computer networking devices) access points, the mobile operator, and so on.

The repository maps existing points of interest to a category of interest, the changes in location of the existing points of interest to a category of interest, and new points of interest to a category of interest. The device can be a mobile phone that communicates with a server to receive the notification of interest.

In another implementation, geographical location of a device of a truck driver is tracked relative to points of interest. The geographical location of the device is matched to a category of interest associated with the truck driver. A notification is sent (e.g., to the truck driver) to the device of a nearby position of the load. The nearby position of the load is related to the category of interest, and the notification is sent in response to the proximity of the geographical location of the device relative to the position of the load. Note that the notification need not be sent to the truck driver for perception, but to the truck driver device to trigger application launch and application actions such as to begin capturing data (e.g., images via a device camera, audio signals via a device microphone, geolocation tracking data, clock data, orientation data via an onboard accelerometer, etc.).

Figure 12:
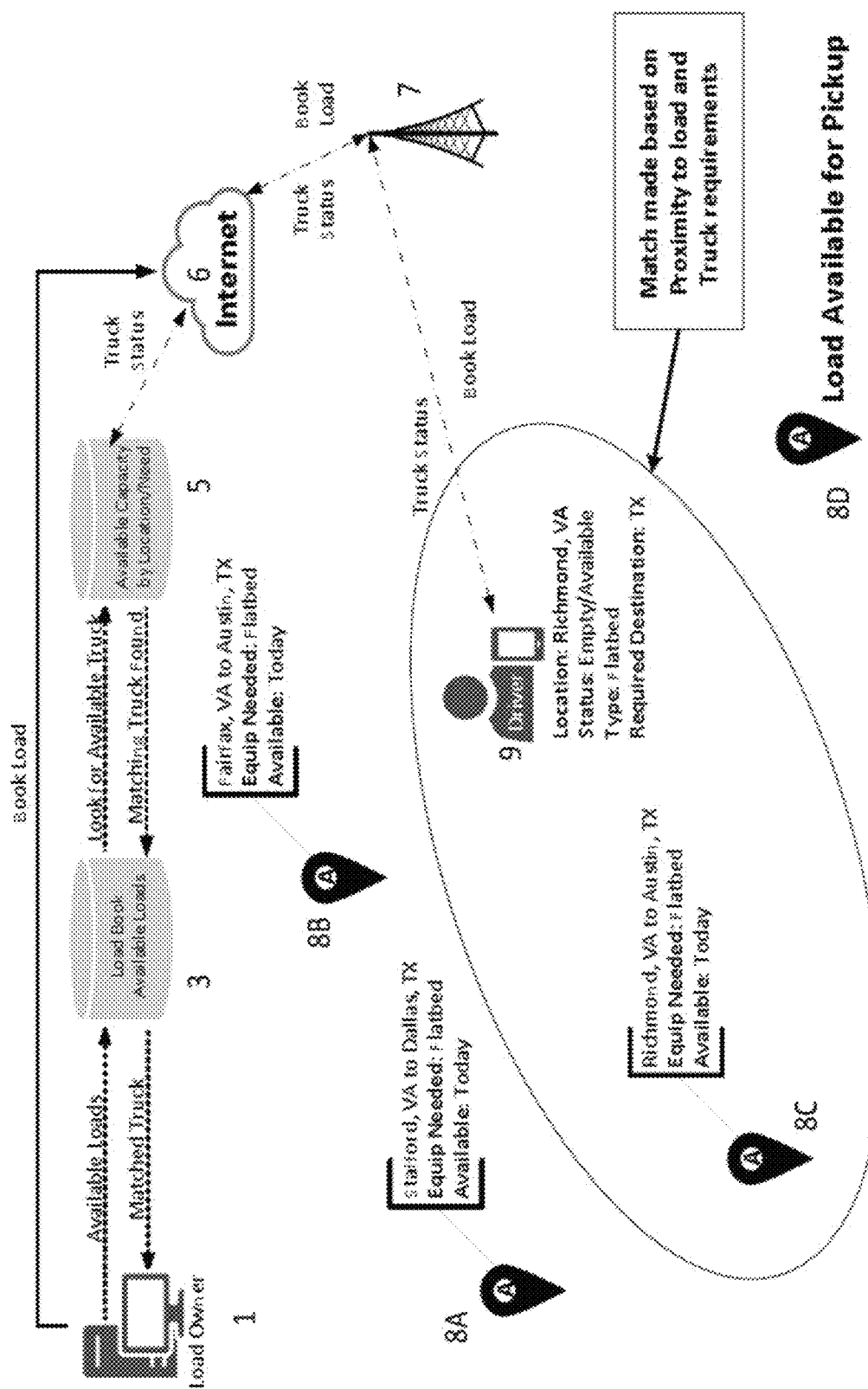
FIG. 12 shows an exemplary environment for matching truckers to loads.

FIG. 12 shows an exemplary environment for matching truckers to loads. A load owner 1 (such as a manufacturer who needs to ship products) searches a load book database computer 3 for available load trucks. The database computer 3 searches a second database computer 5 for available capacity by location and/or need. The database computer 3 looks for available truck from database computer 5, and in response the computer 5 returns matching truck(s). The database computer 5 communicates truck status over the Internet 6 and such truck status and book load information can be wireless communicated using cellular towers 7, for example to a plurality of subscribers 8A-8D in various locations. In this example, the system matches driver 9 to load 8C based on proximity to load and truck requirements.

In one embodiment, the geographic location of the truck driver is tracked and known (via the truck driver device). Points of interest in proximity to the truck driver location are computed. The points of interest are determined based on one or more categories of interest defined by the truck driver and/or learned based on truck driver history relative to previous points of interest visited (and/or not visited) and a list of points of interest is created. Geo-fencing can be performed. Geo-fencing compares the truck driver location to the locations associated with the corresponding points of interest of the created list. Any position of the load that meets the proximity criteria of the virtual perimeter of the geo-fence is sent in a notification to the truck driver. The notification can include multiple points of interest that meet the proximity criteria of the geo-fence.

Each of the blocks in the flow diagram can execute on the client, on a server, or a combination of the client and the server, thereby creating the following alternatives. In a client-only scenario, the client (of the truck driver device) performs the queries for locations on the client, implicitly, in the background based on location changes of the truck driver device. In a combined client/server scenario, the queries are generated on the server, using the current client location. The resulting potential locations are sent to the client for further local processing (geo-fencing). Two variations for passing the location information from the server to the client are a pull approach and a push approach. In the pull approach, the client sends its location to the server and receives the list of points of interest. In a server-only scenario, both the queries and the geo-fencing are executed on the server. Only the alerts to the truck driver are pushed to the client.

One embodiment uses a pull approach system between a truck client and a TruckPath server for discovering nearby places. For example, the client phone detects a location change of the truck driver device and sends its location to the server. The server executes a truck driver search query to find points of interest (POIs) in proximity of the truck driver location. The server returns a list of discovered POIs to the client device in the truck. The client mobile device performs geo-fencing based on the list. Any triggered geo-fences results in notification to the client device (mobile phone) for presentation to the device truck driver.

Figure 13:
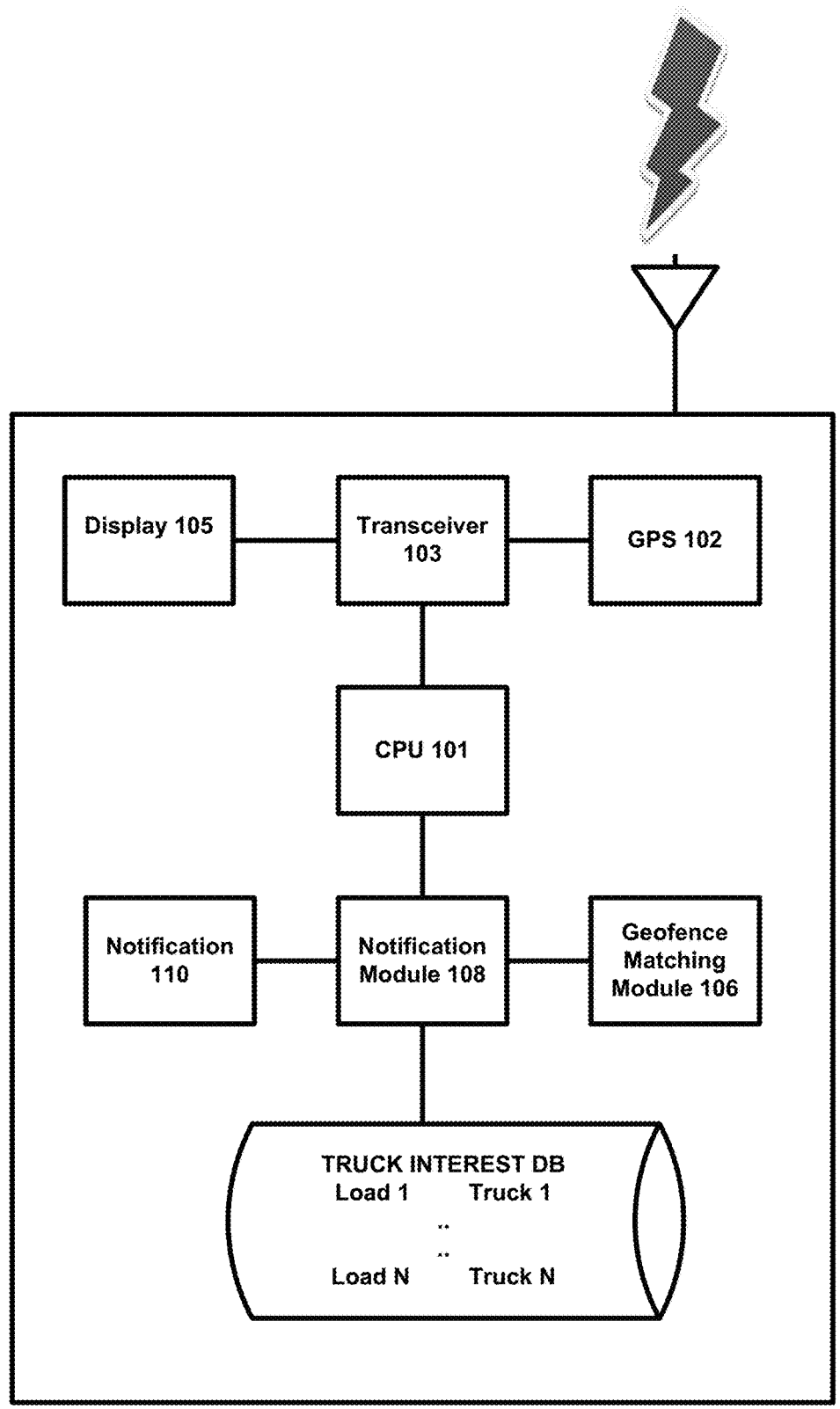
FIG. 13 shows an exemplary mobile device providing load matching for a trucker.

FIG. 13 shows an exemplary mobile device carried in a truck. The system 100 includes a location tracking component such as a GPS 102 that tracks geographical location (e.g., relative to a geographic area or region 106 or 108) of a truck driver device 104 (e.g., a mobile phone), and a notification component 108 that sends a notification 110 based on criteria (e.g., proximity) associated with the truck driver device 104 as related to a position of the load 112. The position of the load 112 corresponds to a specified category of interest 114. The proximity is determined based on the geographical location of a truck driver device 104 relative to the position of the load 112.

The notification component 108 sends the notification 110 to the truck driver device 104 in response to the location tracking component 102 detecting proximity of the truck driver device 104, as a criterion, based on a geo-fencing process. Points of interest (e.g., position of the load 112 and a third position of the load 116) associated with the truck driver can be learned based on a history developed from previous points of interest accessed by the truck driver. The truck driver device 104 can be a mobile phone that is tracked geographically and receives the notification 110 of nearby points of interest based on geo-fencing. Note that the notification can be presented in one or more ways such as audio, image, video, truck driver interface popup dialog, ringtones, beeps, etc.

Note that the system described herein can process multiple geo-fences concurrently to discover points of interest associated with different categories of interest. For example, the geolocation of the truck driver device can trigger notifications for frozen food loads as well as cold temperature medical supply, both of which relate to transportation of low temperature materials but medical loads may be more profitable to the trucker in this example.

In another embodiment, the system 104 includes a definition component via which one or more categories of load-type interest can be specified. In one embodiment shown in FIG. 11B, a truck driver interface is provided as part of the definition component via which the truck driver can enter category information associated with categories of points of interest. The definition component can receive a query which specifies a product or service related to a position of the load. The notification component 108 sends the notification module 110 based on proximity of the truck driver device 104 to the position of the load 112 that provides the product or service.

The geo-location information for points of interest can be stored in a storage component such as a repository database. The points of interest and associated geo-location information can be obtained from various sources such as web searches, and read from databases, for example. The location tracking component of the mobile phone tracks geographical location of the device relative to categories of geographical points of interest, a repository (e.g., the storage component) of location information that stores and relates the location information to the categories of the geographical points of interest. The location information can be updated as to changes in location of existing points of interest and updated with new points of interest. The notification module 108 queries the repository based on the geographical location of the device and presents a notification via the device based on proximity of the device to points of interest. The system can further comprise a definition component via which the category of interest is specified. The definition component receives a query (e.g., implicit) that specifies a product or service related to a position of the load. The notification component sends a notification to the truck driver device based on the criteria (e.g., proximity of the truck driver device to the position of the load).

The system can further comprise a storage component 114 (e.g., a repository) that stores geographical location information of the loads or points of interest and the specified category of interest. Note that the storage component 114 can be local to the truck driver device 104, storage remote from the truck driver device 104, or as a shared storage over both the truck driver device 104 and the remote storage. The position of the load of the truck driver is mapped to the category of interest in the storage component 114. The system uses the client location to query the repository based on the truck driver's categories of interest, and prompts the truck driver when discovering an interesting location.

The desired load information associated with the truck driver can be obtained (learned) by various ways, for example, by tracking truck drivers interests as determined by accessing websites and webpages, truck driver profile information, and so on.

The geographical location information of points of interest in the storage component 114 can also be updated to include new points of interest that are automatically mapped to the category of interest. The new points of interest can be associated with changes in time and location. In other words, a position of the load (e.g., a police checkpoint) can change location, and later, the same position of the load can change to a new location and at a later time.

The notification component 108 can query the storage component 114 based on the geographical location of the truck driver device 104 and the storage component 114 returns points of interest related to the specified category of interest.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 14:
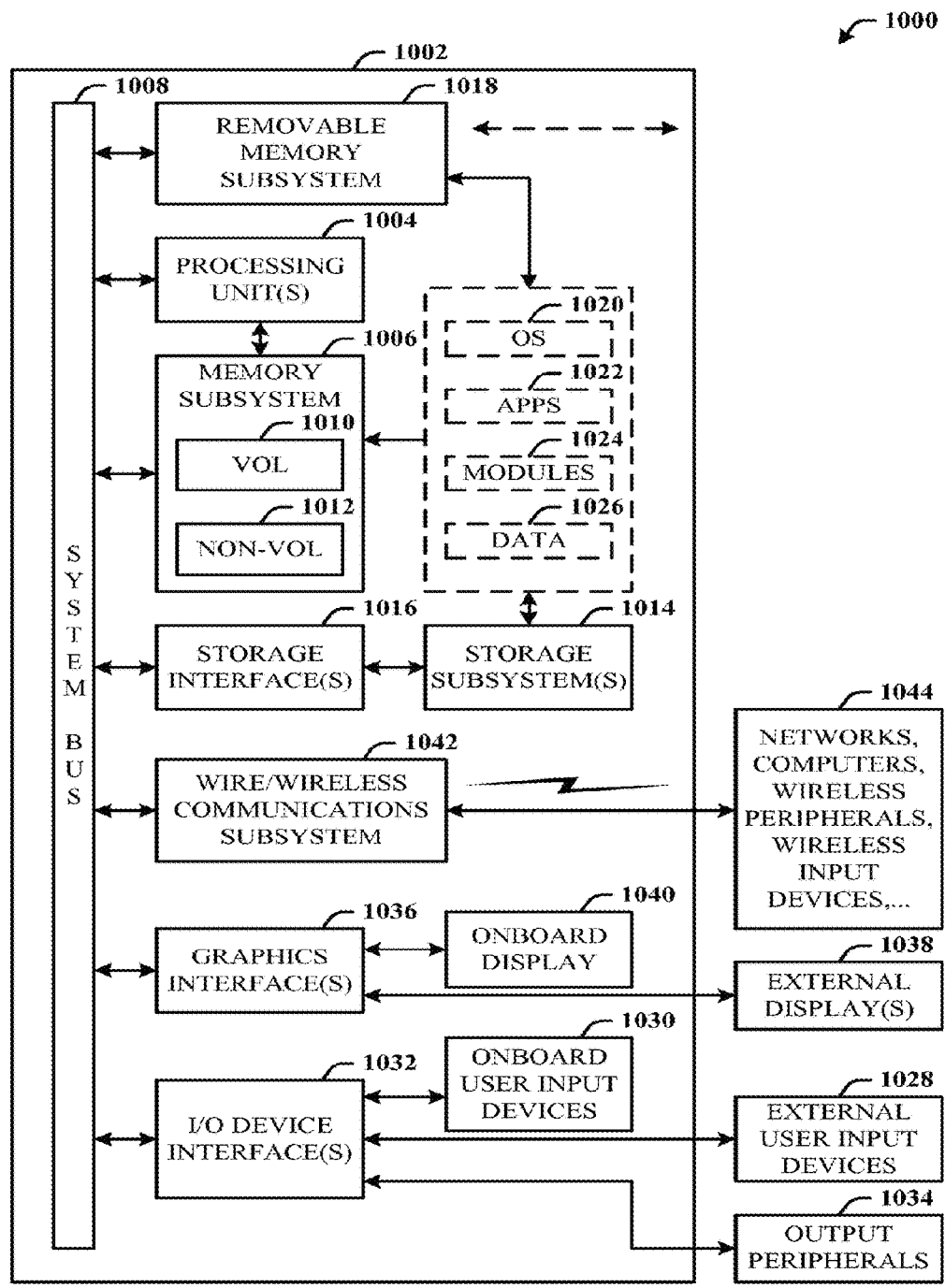
FIG. 14 illustrates a block diagram of a computing system that executes automatic discovery of nearby geographic locations in accordance with the disclosed architecture.

Referring now to FIG. 14, there is illustrated a block diagram of a server-based computing system 1000 that executes automatic discovery of nearby geographic locations in accordance with the disclosed architecture. However, it is appreciated that the some or all aspects of the disclosed methods and/or systems can be implemented as a system-on-a-chip, where analog, digital, mixed signals, and other functions are fabricated on a single chip substrate. In order to provide additional context for various aspects thereof, FIG. 10 and the following description are intended to provide a brief, general description of the suitable computing system 1000 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1000 for implementing various aspects includes the computer 1002 having processing unit(s) 1004, a computer-readable storage such as a system memory 1006, and a system bus 1008. The processing unit(s) 1004 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 1006 can include computer-readable storage (physical storage media) such as a volatile (VOL) memory 1010 (e.g., random access memory (RAM)) and non-volatile memory (NON-VOL) 1012 (e.g., ROM, EPROM, EEPROM, etc.). A basic input/output system (BIOS) can be stored in the non-volatile memory 1012, and includes the basic routines that facilitate the communication of data and signals between components within the computer 1002, such as during startup. The volatile memory 1010 can also include a high-speed RAM such as static RAM for caching data.

The system bus 1008 provides an interface for system components including, but not limited to, the system memory 1006 to the processing unit(s) 1004. The system bus 1008 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1002 further includes machine readable storage subsystem(s) 1014 and storage interface(s) 1016 for interfacing the storage subsystem(s) 1014 to the system bus 1008 and other desired computer components. The storage subsystem(s) 1014 (physical storage media) can include one or more of a hard disk drive (HDD), a magnetic floppy disk drive (FDD), and/or optical disk storage drive (e.g., a CD-ROM drive DVD drive), for example. The storage interface(s) 1016 can include interface technologies such as EIDE, ATA, SATA, and IEEE 1394, for example.

One or more programs and data can be stored in the memory subsystem 1006, a machine readable and removable memory subsystem 1018 (e.g., flash drive form factor technology), and/or the storage subsystem(s) 1014 (e.g., optical, magnetic, solid state), including an operating system 1020, one or more application programs 1022, other program modules 1024, and program data 1026.

Generally, programs include routines, methods, data structures, other software components, etc., that perform particular tasks or implement particular abstract data types. All or portions of the operating system 1020, applications 1022, modules 1024, and/or data 1026 can also be cached in memory such as the volatile memory 1010, for example. It is to be appreciated that the disclosed architecture can be implemented with various commercially available operating systems or combinations of operating systems (e.g., as virtual machines).

The storage subsystem(s) 1014 and memory subsystems (1006 and 1018) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 1002 and includes volatile and non-volatile internal and/or external media that is removable or non-removable. For the computer 1002, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A truck driver can interact with the computer 1002, programs, and data using external truck driver input devices 1028 such as a keyboard and a mouse. Other external truck driver input devices 1028 can include a microphone, an IR (infrared) remote control, a joystick, a game pad, camera recognition systems, a stylus pen, touch screen, gesture systems (e.g., eye movement, head movement, etc.), and/or the like. The truck driver can interact with the computer 1002, programs, and data using onboard truck driver input devices 1030 such a touchpad, microphone, keyboard, etc., where the computer 1002 is a portable computer, for example. These and other input devices are connected to the processing unit(s) 1004 through input/output (I/O) device interface(s) 1032 via the system bus 1008, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 1032 also facilitate the use of output peripherals 1034 such as printers, audio devices, camera devices, and so on, such as a sound card and/or onboard audio processing capability.

One or more graphics interface(s) 1036 (also commonly referred to as a graphics processing unit (GPU)) provide graphics and video signals between the computer 1002 and external display(s) 1038 (e.g., LCD, plasma) and/or onboard displays 1040 (e.g., for portable computer). The graphics interface(s) 1036 can also be manufactured as part of the computer system board.

The computer 1002 can operate in a networked environment (e.g., IP-based) using logical connections via a wired/wireless communications subsystem 1042 to one or more networks and/or other computers. The other computers can include workstations, servers, routers, personal computers, microprocessor-based entertainment appliances, peer devices or other common network nodes, and typically include many or all of the elements described relative to the computer 1002. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1002 connects to the network via a wired/wireless communication subsystem 1042 (e.g., a network interface adapter, onboard transceiver subsystem, etc.) to communicate with wired/wireless networks, wired/wireless printers, wired/wireless input devices 1044, and so on. The computer 1002 can include a modem or other means for establishing communications over the network. In a networked environment, programs and data relative to the computer 1002 can be stored in the remote memory/storage device, as is associated with a distributed system. It will be appreciated that the network connections shown are exemplary and other means of establishing a communications link between the computers can be used.

The computer 1002 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

The illustrated and described aspects can be practiced in distributed computing environments where certain tasks are performed by remote processing devices that are linked through a communications network. In a distributed computing environment, program modules can be located in local and/or remote storage and/or memory system.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented truck load fulfillment method, comprising:
   receiving a global positioning system information from a truck driver device via a data truck network, comprising a data processing server connected to the data truck network accessible by the truck driver device using a wireless communication network through a gateway bridging the data network and the wireless communication network, the data processing server having a database including a pickup location and destinations information, and load characteristics information stored therein, wherein when the data processing server receives the global positioning system information, the data processing server computes a measured position for the truck driver device, stores the measured position of the truck driver device in the database, associates the measured position of the truck driver device with the pickup location and the destinations information, and the load characteristics information in the database;
   correlating the pickup location, the destinations information, and the load characteristics information associated with the truck driver device by tracking truck drivers interests linked through websites, webpages, truck driver profile information;
   comparing a truck driver location to a geographical location associated with a corresponding a point of interest and wherein a position of the load that meets a proximity criteria of a virtual perimeter of a geo-fence is sent in a notification to the truck driver device, wherein the notification includes one or more points of interest that meet the proximity criteria of the virtual perimeter of the geo-fence;
   triggering an application that can be activated by the truck driver device by the global positioning system so that the global positioning system sends an automatically notification to the truck driver device when the geo-fence or perimeter is crossed by a nearby position of the load;
   discovering dynamically a nearby position of the load, the nearby position of the load related to a category of interest, the notification sent in response to proximity of the geographical location of the device relative to the position of the load;
   querying by the database and executed by the server a truck driver search query to find points of interest (POIs) in proximity of the truck driver location returns in response to the search query a list of discovered POIs to the truck driver device in the truck;
   matching the geographical location of the device to the category of interest associated with the truck driver device;
   matching truck stops, parking, rest areas, weigh stations with the geographical location;
   aggregating crowd-sourced information on truck stops, parking, rest areas, weigh stations near the geographical location; and
   prioritizing the matching based on a load type and the desired destination.

2. The system of claim 1, further comprising specifying the category of interest manually or learning the category of interest automatically.

3. The method of claim 1, further comprising applying geo-fencing to trigger proximity of the truck driver device to the position of the load.

4. The method of claim 1, further comprising automatically discovering new loads or points of interest in proximity to the truck driver device based on a detected change in the geographical location of the truck driver device.

5. The method of claim 1, further comprising creating and updating a repository that includes the category of interest in association with the truck driver device, geolocation information for movable points of interest, temporary points of interest, and new points of interest.

6. The method of claim 1, further comprising discovering a position of the load based on an implicit query.

7. The method of claim 1, further comprising creating and presenting a list of points of interest on the truck driver device as the notification to the truck driver and for truck driver interaction.

8. The method of claim 1, comprising uploading the geographical location of the device to a market place.

9. A transportation system, comprising:
a data processing server running a truck market place;
a truck driver mobile device in a truck coupled to the data processing server, the truck driver mobile device including memory storing code for:
receiving a global positioning system information from the truck driver mobile device via a data truck network, comprising the data processing server connected to the data truck network accessible by the truck driver mobile device using a wireless communication network through a gateway bridging the data network and the wireless communication network, the data processing server having a database including a pickup location and destinations information, and load characteristics information stored therein, wherein when the data processing server receives the global positioning system information, the data processing server computes a measured position for the truck driver mobile device, stores the measured position of the truck driver mobile device in the database, associates the measured position of the truck driver mobile device with the pickup location and the destinations information, and the load characteristics information in the database;
correlating the pickup location, the destinations information, and the load characteristics information associated with the truck driver mobile device by tracking truck drivers interests linked through websites, webpages, truck driver profile information;
comparing a truck driver location to a geographical location associated with a corresponding a point of interest and wherein a position of the load that meets a proximity criteria of a virtual perimeter of a geo-fence is sent in a notification to the truck driver mobile device, wherein the notification includes one or more points of interest that meet the proximity criteria of the virtual perimeter of the geo-fence;
triggering an application that can be activated by the truck driver mobile device by the global positioning system so that the global positioning system sends an automatically notification to the truck driver mobile device when the geo-fence or perimeter is crossed by a nearby position of the load;
discovering dynamically a nearby position of the load, the nearby position of the load related to a category of interest, the notification sent in response to proximity of the geographical location of the device relative to the position of the load;
querying by the database and executed by the server a truck driver search query to find points of interest (POIs) in proximity of the truck driver location returns in response to the search query a list of discovered POIs to the truck driver mobile device in the truck;
matching the geographical location of the device to the category of interest associated with the truck driver mobile device;
matching truck stops, parking, rest areas, weigh stations with the geographical location;
aggregating crowd-sourced information on truck stops, parking, rest areas, weigh stations near the geographical location; and
prioritizing the matching based on a load type and the desired destination.

10. The system of claim 9, further comprising code for specifying the category of interest manually or learning the category of interest automatically.

11. The system of claim 9, further comprising code for applying geo-fencing to trigger proximity of the truck driver device to the position of the load.

12. The system of claim 9, further comprising code for automatically discovering new loads or points of interest in proximity to the truck driver device based on a detected change in the geographical location of the truck driver device.

13. The system of claim 9, further comprising code for creating and updating a repository that includes the category of interest in association with the truck driver device, geolocation information for movable points of interest, temporary points of interest, and new points of interest.

14. The system of claim 9, further comprising code for discovering a position of the load based on an implicit query.

15. The system of claim 9, further comprising code for creating and presenting a list of points of interest on the truck driver device as the notification to the truck driver and for truck driver interaction.

16. The system of claim 9, comprising code for uploading the geographical location of the device to a market place.

17. The system of claim 9, wherein the truck driver mobile device comprises one of smart phones, tablets, smart-watches, or geolocation tracking in the truck.

18. The system of claim 9, comprising a communication system including cellular, WiFi, WiMax, or low earth orbit satellite network.

* * * * *